United States Patent [19]

Liu

[11] 4,251,647
[45] Feb. 17, 1981

[54] TERNARY POLYCARBONATE COMPOSITIONS

[75] Inventor: Ping Y. Liu, Naperville, Ill.

[73] Assignee: General Electric Company, Pittsfield, Mass.

[21] Appl. No.: 132,325

[22] Filed: Mar. 20, 1980

[51] Int. Cl.³ .............................................. G08L 53/00
[52] U.S. Cl. ....................................................... 525/91
[58] Field of Search .......................................... 525/91

[56] References Cited

U.S. PATENT DOCUMENTS 3,666,701  5/1972  Marrs ...................................... 525/91

*Primary Examiner*—J. Ziegler
*Attorney, Agent, or Firm*—William F. Mufatti

[57] ABSTRACT

Ternary compositions are disclosed which comprise a mixture of a high molecular weight thermoplastic, aromatic polycarbonate, a styrene/butadiene/caprolactone block copolymer, and either an acrylate copolymer or an olefin-acrylate copolymer.

23 Claims, No Drawings

TERNARY POLYCARBONATE COMPOSITIONS

The present invention is directed to high molecular weight, aromatic polycarbonate compositions having improved aged impact strength and improved low temperature impact strength.

BACKGROUND OF THE INVENTION

It is well known that high molecular weight, aromatic polycarbonate resins have high impact strength below a critical thickness of between about $\frac{1}{8}$ and $\frac{1}{4}$ inches. Above this average thickness, the impact strength of such polycarbonate resins is low. It is also known that the impact strength of these polycarbonate resins decreases rapidly as temperatures decrease below about $-5°$ C. as well as after aging at elevated temperatures above about 100° C. These characteristics limit the fields of applications of these resins. Thus, unmodified polycarbonates are not practical for use at low or high temperatures, particularly when good impact strength is required. Therefore, it is desirable to improve the impact strength of polycarbonate resins at both low and high temperatures as well as improve their aged impact strength and thereby expand the fields of application of such resins.

Polycarbonate compositions having improved impact strength at both high and low temperatures as well as improved aged impact strength are disclosed in co-pending applications Ser. Nos. 69,822; 69,823; 69,824; and 69,825 all of which were filed Aug. 27, 1979 as well as in co-pending applications Ser. Nos. 132,190, 132,330, and 132,331 filed of even date with this application.

DESCRIPTION OF THE INVENTION

It has now been found that additional ternary compositions comprising a high molecular weight, thermoplastic, aromatic polycarbonate, a styrene/butadiene/caprolactone block copolymer and either an acrylate copolymer or an olefin-acrylate copolymer also exhibit improved aged impact strength and that certain formulations thereof exhibit improved impact strength at both low and high temperatures as compared to unmodified polycarbonate resins.

The high molecular weight, thermoplastic, aromatic polycarbonates which can be employed in the present invention are those homopolycarbonates and copolycarbonates and mixtures thereof which have average molecular weights of about 8,000 to more than 200,000, preferably about 20,000 to 80,000 and an intrinsic viscosity (I.V.) of about 0.40 to 1.0 deciliters/grams (dl/g) as measured in methylene chloride at 25° c. These polycarbonates are typically derived from dihydric phenols such as, for example, 2,2-bis(4-hydroxyphenyl)propane (also referred to as bisphenol-A; i.e., BPA) bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxyphenyl)propane, 2,2-(3,5,3',5'-tetrabromo-4,4'-dihydroxydiphenyl)propane, and (3,3'-dichloro-4,4'-dihydroxydiphenyl)methane. Other dihydric phenols which are suitable for use in preparing these polycarbonates are disclosed in U.S. Pat. Nos. 2,999,835; 3,028,365; 3,334,154; and 4,131,575, all of which are incorporated herein by reference.

The aromatic polycarbonates of the invention can be manufactured by known processes such as, for example, the interfacial polymerization technique wherein a dihydric phenol is reacted with a carbonate precursor, such as phosgene, in the presence of a suitable organic medium, such as methylene chloride. These processes are disclosed in the above identified U.S. Patents as well as in U.S. Pat. Nos. 4,018,750 and 4,123,436 which are incorporated herein by reference. Transesterification processes can also be employed to prepare these resins such as are disclosed in U.S. Pat. No. 3,153,008, also incorporated herein by reference, as well as other processes known to those skilled in the art.

In addition, the aromatic polycarbonates of the invention can include the polymeric derivates of a dihydric phenol, a dicarboxylic acid, and carbonic acid, such as are disclosed in U.S. Pat. No. 3,169,131, incorporated herein by reference.

It is also possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in preparing the aromatic polycarbonate to be employed in the invention. In addition, blends of any of the above materials can be used to provide the aromatic polycarbonate.

Further, branched polycarbonates, such as are disclosed in U.S. Pat. No. 4,001,184 and incorporated herein by reference can also be employed as can blends of a linear polycarbonate and a branched polycarbonate to provide the aromatic polycarbonate of the invention.

The styrene/butadiene/caprolactone (S/B/C) block copolymers of the invention are commercially available or can be prepared by methods known in the art such as described by E. Clark and C. W. Childers, *J. Apply. Poly. Sci.*, vol. 22, p. 1081 (1978) and by H. L. Hsieh, *J. Apply. Poly. Sci.*, vol. 22, p. 1119 (1979) incorporated herein by reference.

The weight ratio of styrene:butadiene:caprolactone in these S/B/C block copolymers can be in the range of about 25–60: 30–50: 25–10 but is preferably 25: 50: 25 or 1:2:1.

The amount of S/B/C block copolymer that can be employed in the ternary compositions of the invention can be about 0.5–4.0, preferably 1.0–3.0, parts by weight per hundred parts of the aromatic polycarbonate.

The "acrylate" copolymer employed in the invention is a copolymer of a $C_1$-$C_5$ methacrylate and a $C_1$-$C_5$ acrylate, wherein "$C_1$-$C_5$" represents both saturated and unsaturated, straight or branched chained aliphatic hydrocarbon radicals having from 1 to 5 carbon atoms and which can be employed in amounts of about 2–6, preferably 3–5, parts by weight per hundred parts of aromatic polycarbonate.

Preferred acrylates for use in the copolymer are methyl acrylate, ethyl acrylate, isobutyl acrylate, 1,4-butanediol diacrylate, n-butyl acrylate, and 1,3-butylene diacrylate. Preferred methacrylates for use in this copolymer include methyl methacrylate, isobutyl methacrylate, 1,3-butylene dimethacrylate, butyl methacrylate and ethyl methacrylate.

Based on the total weight of the copolymer, the acrylate portion thereof can range from about 50–85 weight percent and the methacrylate portion thereof can range from about 15–50 weight percent.

The preferred acrylate copolymer for use in this invention is a copolymer of n-butyl acrylate and methyl methacrylate wherein the weight ratio of n-butyl acrylate: methyl methacrylate is about 3:2.

Suitable acrylate copolymers can be prepared by methods well known to those skilled in the art or can be obtained commercially. For example, Rohm and Haas' Acryloid ® KM 330 copolymer, which is a copolymer of n-butyl acrylate and methyl methacrylate, is suitable for use in the present invention.

The "olefin-acrylate" copolymer which can be employed in the invention is a copolymer of a $C_2$-$C_5$ olefin and a $C_1$-$C_5$ acrylate wherein "$C_1$-$C_5$" is the same as defined above for the "acrylate" copolymer and "$C_2$-$C_5$" represents a straight or branched chain aliphatic hydrocarbon radical having 2-5 carbon atoms.

The olefins employed in the olefin-acrylate copolymer are preferably ethylene, propylene and isobutylene while the preferred acrylates are ethyl acrylate, n-butyl acrylate, 1,3-butylene diacrylate, methyl acrylate, 1,4-butanediol diacrylate and isobutyl acrylate. These olefin-acrylate copolymers can be prepared by methods known to those skilled in the art or can be commercially obtained. For example, Union Carbide's Bakelite ® DPD-6169, an ethylene-ethyl acrylate, is suitable for use in the compositions of the invention.

Based upon the total weight of the olefin-acrylate copolymer, the acrylate portion thereof can be in the range of about 10-30 weight percent and the olefin portion thereof can be in the range of about 70-90 weight percent. A preferred olefin-acrylate copolymer is an ethylene-ethyl acrylate copolymer wherein the weight ratio of ethylene: ethyl acrylate is 4.5:1.

The amount of olefin-acrylate copolymer that can be employed in the compositions of the invention can range from 0.5-4.0, preferably 1-3, parts by weight per hundred parts of the aromatic polycarbonate.

it is also regarded to be among the features of this invention to include in the ternary polycarbonate composition conventional additives for purposes such as reinforcing, coloring or stabilizing the composition in conventional amounts.

The compositions of the invention are prepared by mechanically blending by conventional methods, the high molecular weight aromatic polycarbonate with the S/B/C block copolymer and either the acrylate copolymer or the olefin-acrylate copolymer.

EXAMPLES

The following examples set forth the best mode currently known to illustrate the invention and should not be construed as limiting the scope of the invention. In the examples, all parts and percentages are by weight unless otherwise specified.

EXAMPLE 1

Ninety-six (96) parts of an aromatic polycarbonate, derived from 2,2-bis(4-hydroxyphenyl)propane and having an intrinsic viscosity (I.V.) in the range of from about 0.46 to about 0.49 dl/g as determined in methylene chloride solution at 25° C., was mixed with three (3) parts of an acrylate copolymer of n-butyl acrylate and methyl methacrylate having a weight ratio of n-butylacrylate: methyl methacrylate of about 3:2, and one (1.0) part of a styrene/butadiene/caprolactone (S/B/C) block copolymer having a weight ratio of 1/2/1. The ingredients were then blended together by mechanically mixing them in a laboratory tumbler and the resulting mixture was fed to an extruder which was operated at about 265° C. The resulting extrudate was comminuted into pellets and the pellets were injection molded at about 290°–310° C. into test specimens of about 5" by ½" by ¼" and 5" by ½" by ⅛", the later dimensions being the specimen thicknesses. Izod impact strengths of these specimens were measured according to the notched Izod test, ASTM D256, and are set forth in Table I. The ductile-brittle (D/B) transition temperatures, (the highest temperature at which a sample begins to exhibit a brittle mode of failure rather than a ductile mode of failure) were obtained according to the procedures of ASTM D256 and are also listed in Table I. The sample labeled CONTROL was obtained from a polycarbonate resin having an I.V. of about 0.46–0.49 dl/g and was prepared without either the acrylate copolymer or the S/B/C block copolymer.

EXAMPLE 2

The procedure of Example 1 was repeated exactly, except that the weight parts of polycarbonate, acrylate copolymer and the S/B/C block copolymer in the test specimen were, respectively, 96, 2 and 2. The test results obtained are listed in Table I.

EXAMPLE 3

The procedure of Example 1 was repeated exactly, except that the weight parts of polycarbonate, acrylate copolymer and the S/B/C copolymer in the test specimens were, respectively, 96, 1 and 3. The test results obtained are listed in Table I.

EXAMPLE 4

The procedure of Example 1 was repeated exactly except that th weight parts of polycarbonate, acrylate copolymer, and the S/B/C block copolymer were, respectively, 95, 3 and 2. The test results obtained are listed in Table I.

EXAMPLE 5

The procedure of Example 1 was repeated exactly, except that an olefin-acrylate copolymer of ethylene-ethyl acrylate was employed in place of the acrylate copolymer. The weight ratio of ethylene: ethyl acrylate was 4.5:1 and the weight parts of polycarbonate, ethylene-ethyl acrylate copolymer and the S/B/C block copolymer in the test specimens were, respectively, 96, 1 and 3. The test results obtained are listed in Table I.

All of the test specimens obtained from the foregoing examples were opaque.

TABLE I

| | Impact Strength, ft. lb./in. | | | | |
| | | | ⅛", Heat Aged at 125° C. | | D/B, °C. |
| Composition of | ¼" Thick Not Aged | ⅛" Thick Not Aged | 24 hrs. | 48 hrs. | ⅛" Not Aged** |
|---|---|---|---|---|---|
| Example 1 | 12.5[1] | * | 13.3[1] | * | −23/−29 |
| Example 2 | 13.1[1] | 15.3[1] | 12.7[1] | 12.0[1] | * |
| Example 3 | 11.8[1] | * | 13.5[1] | * | −12/−18 |
| Example 4 | 13.1[1] | 15.3[1] | 12.7[1] | 12.0[1] | * |
| Example 5 | 11.6[1] | 15.3[1] | 12.7[1] | 12.0[1] | −23/−29 |
| CONTROL | 1.6[2] | 14.8[1] | 1.3[2] | * | >−5 |

[1]Samples failed with 100% ductility.
[2]Samples failed with 0% ductility.
*Test not made.
**Change from ductile mode of failure to brittle mode of failure noted over indicated range.

What is claimed is:
1. A ternary polycarbonate composition comprising an admixture of a high molecular weight aromatic polycarbonate, a minor amount of a styrene/butadiene/caprolactone block copolymer, and a minor amount of an acrylate copolymer or an olefin-acrylate copolymer, said acrylate copolymer being a copolymer of a $C_1$-$C_5$ acrylate and a $C_1$-$C_5$ methacrylate, said olefin-acrylate copolymer being a $C_2$-$C_5$ olefin and a $C_1$-$C_5$ acrylate copolymer.

2. The composition of claim 1 wheren said styrene/butadiene/caprolactone block copolymer is present in an amount of about 0.5–4.0 parts by weight per hundred parts of said aromatic polycarbonate.

3. The composition of claim 2 wherein said block copolymer is present in an amount of about 1.0–3.0 parts by weight.

4. The composition of claim 1 wherein the weight ratio of styrene:butadiene:caprolactone in said block copolymer is in the range of about 25–60:30–50:25–10.

5. The composition of claim 4 wherein said weight ratio is 1:2:1.

6. The composition of claim 1 wherein said acrylate copolymer is present in an amount of about 2–6 parts by weight per hundred parts of said aromatic polycarbonate.

7. The composition of claim 6 wherein said acrylate copolymer is present in an amount of about 3–5 parts by weight.

8. The composition of claim 1 wherein the acrylate portion of said acrylate copolymer is selected from the group consisting of ethyl acrylate, n-butyl acrylate, 1,3-butylene diacrylate, isobutyl acrylate, 1,4-butanediol diacrylate and methyl acrylate, the methacrylate portion of said acrylate copolymer is selected from the group consisting of methyl methacrylate, 1,3 butylene dimethacrylate, isobutyl methacrylate, butyl methacrylate and ethyl methacrylate 9. The composition of claim 8 wherein the weight ratio of acrylate:methacrylate in said acrylate copolymer ranges from about 15–50: 50–85.

10. The composition of claim 1 wherein the olefin portion of said olefin-acrylate copolymer is selected from the group consisting of ethylene, propylene and isobutylene, the acrylate portion of said olefin-acrylate copolymer is selected from the group consisting of ethyl acrylate, n-butyl acrylate, 1,3-butylene diacrylate, methyl acrylate, 1,4-butanediol diacrylate and isobutyl acrylate.

11. The composition of claim 10 wherein the weight ratio of olefin:acrylate in said olefin-acrylate copolymer is in the range of about 70–90: 10–30.

12. The composition of claim 10 wherein said olefin-acrylate copolymer is an ethylene-ethyl acrylate copolymer having a weight ratio of ethylene-ethyl acrylate of about 4.5:1.

13. The composition of claim 1 wherein said olefin-acrylate copolymer is present in an amount of about 0.5–4.0 parts by weight per hundred parts of said aromatic polycarbonate.

14. The composition of claim 13 wherein said olefin-acrylate copolymer is present in an amount of about 1–3 parts by weight.

15. The composition of claim 1 wherein the aromatic polycarbonate is derived from 2,2-bis(4-hydroxyphenyl)propane.

16. A ternary polycarbonate composition comprising an admixture of a high molecular weight aromatic polycarbonate; a styrene/butadiene/caprolactone block copolymer in an amount of about 0.5–4.0 parts by weight per hundred parts of said aromatic polycarbonate; and, an acrylate copolymer in an amount of about 2–6 parts by weight per hundred parts of said aromatic polycarbonate or an olefin-acrylate copolymer in an amount of about 0.5–4.0 parts by weight per hundred parts of said aromatic polycarbonate, said acrylate copolymer being a copolymer of a $C_1$-$C_5$ acrylate and a $C_1$-$C_5$ methacrylate with the acrylate portion being a member selected from the group consisting of methyl acrylate, ethyl acrylate, n-butyl acrylate, 1,3-butylene diacrylate, isobutyl acrylate, and 1,4-butanediol diacrylate, the methacrylate portion being a member selected from the group consisting of methyl methacrylate, ethyl methacrylate, butyl methacrylate, isobutyl methacrylate, and 1,3-butylene dimethacrylate, said olefin-acrylate copolymer being a $C_2$-$C_5$ olefin and a $C_1$-$C_5$ acrylate copolymer, said olefin portion being a member selected from the group consisting of ethylene, propylene and isobutylene, said acrylate portion being a member selected from the group consisting of ethyl acrylate, n-butyl acrylate, 1,3-butylene diacrylate, methyl acrylate, 1,4-butanediol diacrylate and isobutyl acrylate.

17. The composition of claim 16 wherein said block copolymer is present in an amount of about 1.0–3.0 parts by weight, said acrylate copolymer is present in an amount of about 3–5 parts by weight or said olefin-acrylate copolymer is present in an amount of about 1–3 parts by weight.

18. The composition of claim 16 wherein the weight ratio of styrene:butadiene:caprolactone in said block copolymer is in the range of about 25–60:30–50:25–10.

19. The composition of claim 18 wherein said block weight ratio is 1:2:1.

20. The composition of claim 16 wherein the weight ratio of acrylate: methacrylate in said acrylate copolymer ranges from about 15–50: 50–85.

21. The composition of claim 16 wherein the weight ratio of olefin: acrylate in said olefin-acrylate copolymer is in the range of about 70–90: 10–30.

22. The composition of claim 16 wherein said olefin-acrylate copolymer is an ethylene-ethyl acrylate copolymer having a weight ratio of ethylene: ethyl acrylate of about 4.5:1.

23. The composition of claim 16 wherein said aromatic polycarbonate is derived from 2,2-bis(4-hydroxy phenyl)propane.

* * * * *